United States Patent [19]

Bernal G.

[11] 4,111,520
[45] Sep. 5, 1978

[54] FABRICATION OF OPTICAL WAVEGUIDES
[75] Inventor: Enrique Bernal G., Minnetonka, Minn.
[73] Assignee: Honeywell Inc., Minneapolis, Minn.
[21] Appl. No.: 540,920
[22] Filed: Jan. 13, 1975
[51] Int. Cl.² .............................................. G02B 5/14
[52] U.S. Cl. ................................................. 350/96.12
[58] Field of Search ....................... 350/96 WG, 96.12

[56] References Cited

U.S. PATENT DOCUMENTS

| | | | |
|---|---|---|---|
| 3,542,536 | 11/1970 | Flam et al. | 350/96 WG |
| 3,809,686 | 5/1974 | Chandross et al. | 350/96 WG |

OTHER PUBLICATIONS

"Fabrication of channel optical waveguides in glass by cw laser heating" by Pavlopoulos and Crabtree, J. App. Phys. vol. 45, No. 11, Nov. 1974.

*Primary Examiner*—John K. Corbin
*Assistant Examiner*—Stewart Levy
*Attorney, Agent, or Firm*—Omund R. Dahle

[57] ABSTRACT

Optical waveguides are fabricated by heating a region of a body of optical material with an energy beam. The region is locally heated to a temperature at which plastic deformation occurs as a result of the constraints placed by the unheated adjacent material. The plastic strain produced at high temperature translates into a residual stress as the material cools which results in a greater index of refraction within the region than in surrounding regions.

3 Claims, 3 Drawing Figures

FABRICATION OF OPTICAL WAVEGUIDES

REFERENCE TO CO-PENDING APPLICATION

Reference is made to a co-pending application Ser. No. 540,919 Di Chen and Barry G. Koepke entitled "Optical Waveguide", filed on Jan. 13, 1975 with this application and assigned to the same assignee as this application.

BACKGROUND OF THE INVENTION

Techniques of guiding optical waves in planar optical materials, with an ultimate objective of achieving integrated optics similar to integrated electronics, have been advancing rapidly in the last few years. Optical waveguide components such as modulators, deflectors, lasers, detectors and other passive and active devices are being demonstrated and developed in research laboratories throughout the world. The activity can be divided into the following areas: (1) the development of techniques of guiding the optical waves, (2) the development of suitable materials media and (3) the development of modern microfabrication technology. It is of paramount importance to the objective of optical integration that all of these can be simultaneously satisfied in a material which possesses desirable physical effects.

Waveguiding in many useful optical media has been achieved. Thin film waveguides have been prepared on suitable substrates by, for example, sputtering, R. H. Deitch, E. J. West, T. G. Giallorenzi and J. F. Weller, "Sputtered Thin Films for Integrated Optics", Appl. Opt., 13, 712 (1974) and epitaxial growth, W. T. Lindley, R. J. Phelan, C. M. Wolfe and A. G. Foyt, Appl. Phys. Lett., 14, 197 (1969). Waveguiding has also been achieved by modification of the refractive index of the medium surface by diffusion, I. P. Kaminow and J. R. Carruthers, Appl. Phys. Lett., 22, 326 (1973); proton irradiation, E. R. Schineller, R. P. Flan and D. W. Wilmot, "Optical Waveguides Formed by Proton Irradiation of Fused Silica", J. Opt. Soc. Am., 58, 1171 (1968); and ion implantation, E. Garmire, H. Stoll, A. Yariv and R. G. Hunsperger, Appl. Phys. Lett., 21, 87 (1972).

SUMMARY OF THE INVENTION

In the present invention, optical waveguides are produced by heating a region of a body of optical material. The heating produces a residual stress within the region which was heated. The residual stress, in turn, results in an index of refraction within the region which is greater than the index of refraction of surrounding, unheated, regions.

DETAILED DESCRIPTION OF THE PREFERRED EMBODIMENTS

In an optical waveguide of the type used for integrated optics, the waveguide region must have an index of refraction which is greater than the surrounding regions. In the previously mentioned co-pending patent application by Di Chen and Barry G. Koepke, it is taught that the greater index of refraction within the waveguide region can be produced by residual stress. The present application teaches a highly advantageous method of forming a waveguide having a stress-induced increase in refractive index.

Figure 1:
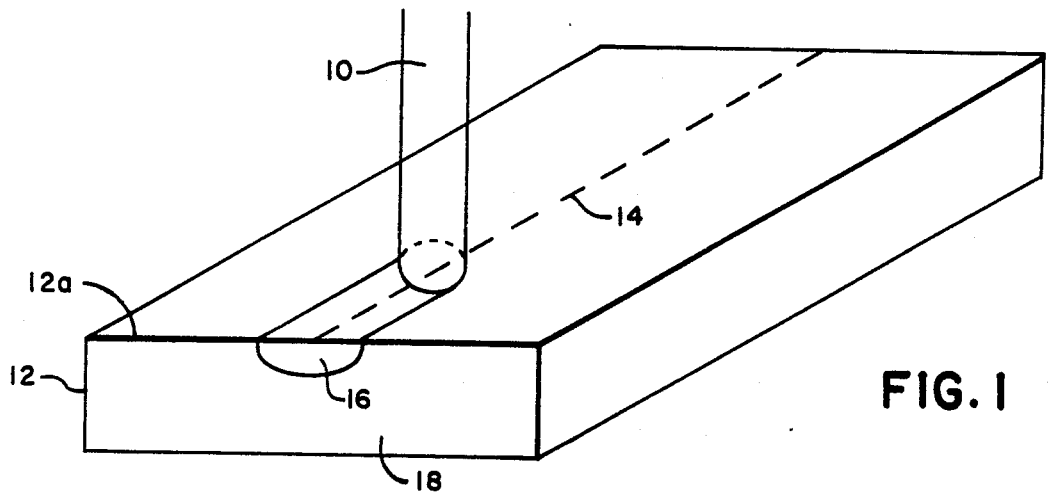
FIG. 1 shows the formation of an optical waveguide by heating with an energy beam.

FIG. 1 shows diagrammatically the method of the present invention. An energy beam 10 is directed upon a surface 12a of optical body 12. Energy beam 10 is directed across surface 12a along the path described by dotted line 14. Energy beam 10 has an intensity which is sufficient to cause heating of region 16 within body 12 to a temperature at which plastic deformation occurs.

The material in region 16 tries to expand as its temperature rises, but is constrained on three sides by the adjacent material 18 that is not heated. This causes the heated material in region 16 to be under compression. At a certain temperature, the stress in the heated region exceeds the yield strength of the material and plastic deformation takes place in region 16. As the material in region 16 cools, it finds itself in a state of tension which changes the refractive index at room temperature relative to that of the undeformed material. E. Bernal G. and B. G. Koepke, "Residual Stresses in Machined MgO Crystals", J. Am. Ceram. Soc., 56, 634 (1973). When the resultant change increases the index of refraction in deformed region 16, waveguiding within region 16 can be obtained.

The actual process occuring in the heating cycle is that a plastic strain is introduced at high temperatures as a result of the localized heating in the presence of constraints. This state of plastic strain then translates into a mixed state of stress and strain at room temperature. S. Kaufman, "Finite-Element Method for the Determination of Thermal Stresses in Anisotropic Solids of Revolution", Bell System Technical Journal, 53, 825, at 840 (1974). This mixed state of stress and strain causes the change in refractive index. E. Bernal G. and B. G. Koepke, supra. For the sake of conciseness, this is referred to throughout the present specification and claims as a change in refractive index caused by residual stress.

Figure 2:
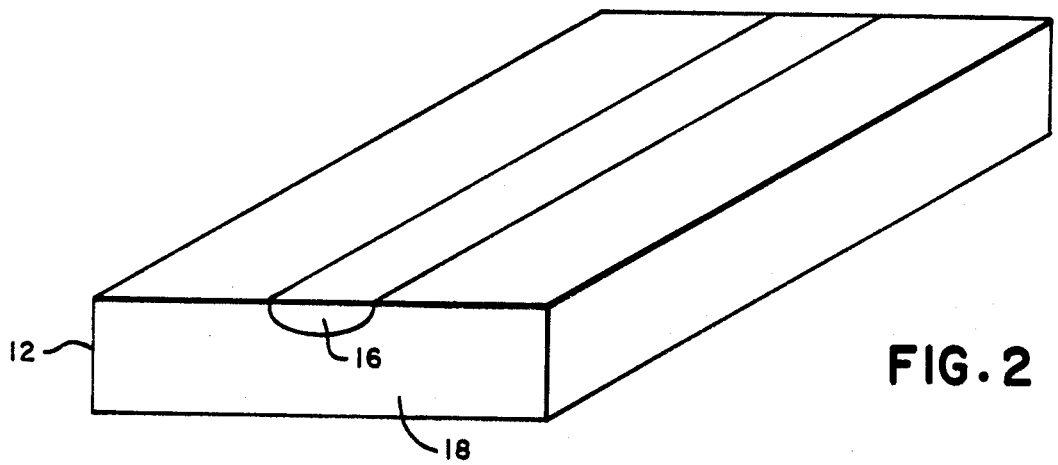
FIG. 2 shows an optical waveguide formed by the process shown in FIG. 1.

FIG. 2 shows the waveguide structure formed by the method of FIG. 1. Waveguide region 16 and substrate region 18 of body 12 are nominally the same material. Waveguide region 16, however, has been heated by an energy beam to cause plastic deformation. This deformation has resulted in an increase in the refractive index of waveguide region 16 with respect to substrate region 18. The depth of the waveguide can be controlled by the depth of penetration of the beam and the rate at which it is scanned over the surface in order to control thermal diffusion effects.

Figure 3:
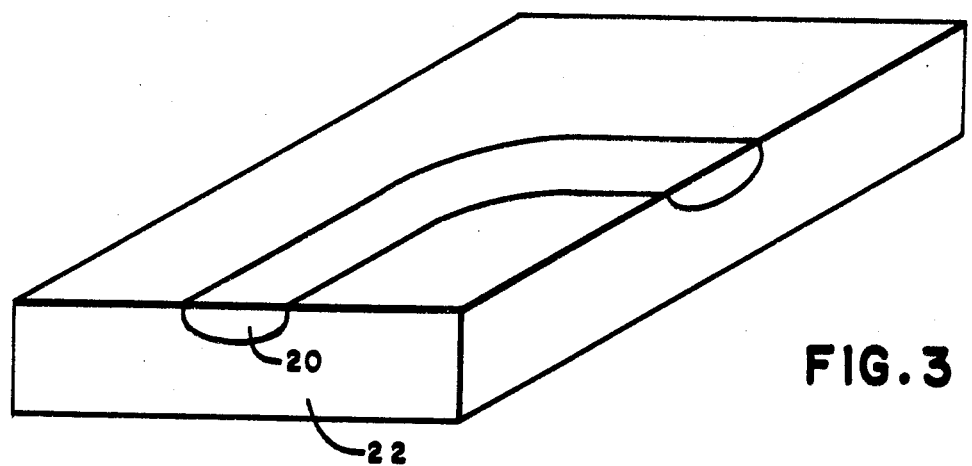
FIG. 3 shows another optical waveguide formed by the process of the present invention.

An advantage of the present fabrication technique is that a wide variety of waveguide patterns can easily be formed. FIG. 2 shows a straight line waveguide channel. FIG. 3, on the other hand, shows a curved waveguide 20 surrounded on three sides by substrate 22.

The heating to produce a plastically deformed waveguide region may be achieved by a variety of different techniques. For example, energy beam 10 may be a laser beam, or a charged particle beam such as an electron beam. Other techniques for producing localized heating are also possible.

If a laser beam is used to produce the localized heating, the wavelength of the laser beam should be different from the wavelength at which the waveguide is intended to operate. Ordinarily, the absorption of radiation of the wavelength at which the waveguide is to operate will be very low.

The electron beam technique is particularly advantageous. The scanning of a high intensity electron beam over the surface of the optical body produces localized heating. The range of electrons in substrates having heavy metal ions (like lanthanum-modified lead zirconate titanate) is on the order of a few thousand angstroms. Because of thermal conduction, however, the depth of the heated zone can be varied from a minimum of about 1 micrometer to several micrometers. The lateral extent of the heated region is also controlled by thermal conduction, since the electron beam can be focused to submicron spot sizes. The width of the waveguide region, therefore, should be similar to its depth and controllable by adjusting the electron beam intensity and the scan rate across the surface.

The fabrication technique of the present invention has many advantages. First, the technique is very simple. Second, the technique produces smooth, easily controlled waveguide profiles. Third, a wide variety of waveguide patterns can be formed by merely controlling the path followed by the energy beam. Fourth, the technique is applicable to a wide variety of optical waveguide materials, including electro-optic, magneto-optic, and acousto-optic materials.

In conclusion, this invention has been described with reference to a series of preferred embodiments. Workers skilled in the art, however, will recognize that changes may be made in form and detail without departing from the spirit and scope of the invention.

The embodiments of the invention in which an exclusive property or right is claimed are defined as follows:

1. A surface optical waveguide comprising a body of optical material having substrate and surface waveguide regions, the upper surface of the waveguide region being substantially coplanar with a major surface of the material so that the waveguide region extends downwardly from said major surface, the substrate region having a first index of refraction and the surface waveguide region having a second index of refraction, the second index of refraction being greater than the first index of refraction as a result of residual stress within the waveguide region created by laser beam heating of the surface waveguide region, said heating being sufficient to cause plastic deformation within the surface waveguide region, but not sufficient to cause evaporation of the material.

2. A method of forming a surface optical waveguide, in which the upper surface of the waveguide is substantially coplanar with a major surface of a body of optical material, the method comprising heating a surface region of a body of optical material by directing a laser beam onto the surface of the body sufficient to cause plastic deformation within the surface region, but not sufficient to cause evaporation of the optical material, the plastic deformation causing residual stress within the surface region which results in a greater index of refraction within the surface region than in surrounding regions.

3. A method of forming a surface optical waveguide in which the upper surface of the waveguide is substantially coplanar with a major surface of a body of optical material, the method comprising heating a region of the surface of a body of optical material with a laser beam sufficiently to produce a residual stress which increases the refractive index within the surface region, the heating being sufficient to cause plastic deformation within the surface region but not to cause evaporation of the optical material, such that the refractive index within the region is greater than the refractive index of unheated regions of the body.

* * * * *